United States Patent [19]

Kawakami et al.

[11] Patent Number: 4,864,435
[45] Date of Patent: Sep. 5, 1989

[54] MAGNETIC RECORD ERASE CIRCUIT

[75] Inventors: Chikuni Kawakami; Koji Shimanuki, both of Tokyo, Japan

[73] Assignee: Fuji Photo Film Co., Ltd., Kanagawa, Japan

[21] Appl. No.: 51,653

[22] Filed: May 20, 1987

[30] Foreign Application Priority Data

May 20, 1986 [JP] Japan .................................. 61-113665
Sep. 24, 1986 [JP] Japan .................................. 61-225465
Sep. 25, 1986 [JP] Japan .................................. 61-226574

[51] Int. Cl.$^4$ .............................................. G11B 5/03
[52] U.S. Cl. ...................................................... 360/66
[58] Field of Search ................................. 360/66, 33.1

[56] References Cited

U.S. PATENT DOCUMENTS 4,717,975 1/1988 Ogura et al. ......................... 360/66

Primary Examiner—Vincent P. Canney
Attorney, Agent, or Firm—Birch, Stewart, Kolasch & Birch

[57] ABSTRACT

A magnetic record erase circuit which is capable of substantially erasing frequency signals such as video signals recorded in a rotary magnetic recording medium such as a magnetic disc or a magnetic drum. In the magnetic record erase circuit, when a plurality of frequency-multiplexed signals recorded in one or all of tracks provided on the rotary magnetic recording medium are to be erased, the frequency of an erase signal to be supplied to a magnetic head forming a part of recording means can be varied increasingly stepwise in a given range and at least in the lower frequency region of the given range the current value of the erase signal can be set higher than the optimum recording current value of the magnetic head.

17 Claims, 11 Drawing Sheets

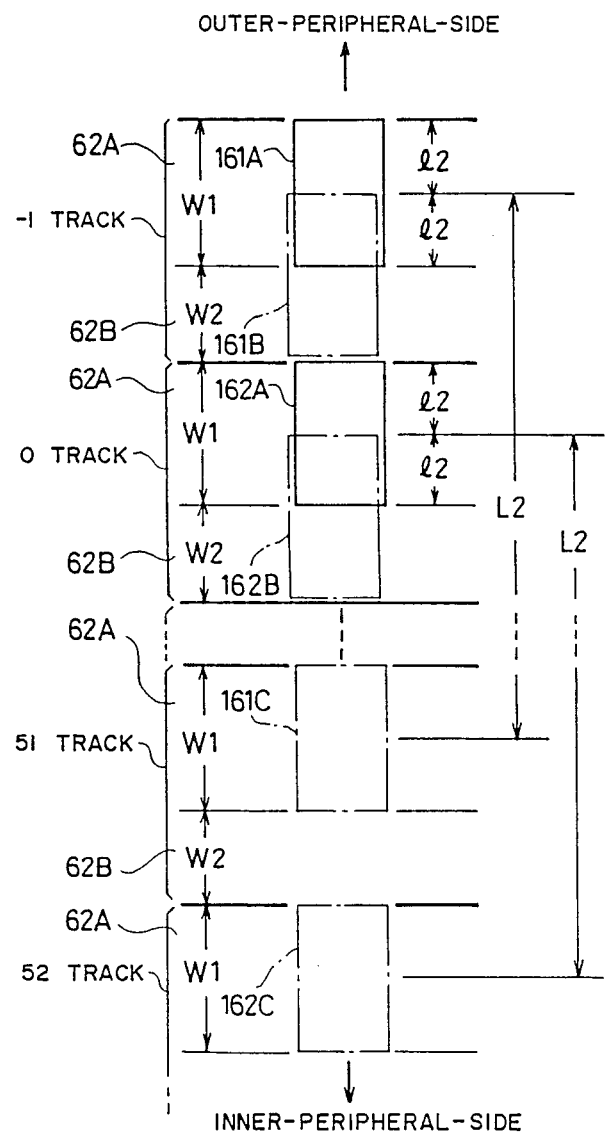

MAGNETIC RECORD ERASE CIRCUIT

BACKGROUND OF THE INVENTION

1. Field of the Invention

The present invention relates to a magnetic record erase circuit and, in particular, to a magnetic record erase circuit which is capable of substantially erasing frequency signals such as video signals recorded in a rotary magnetic recording medium such as a magnetic disc, a magnetic drum or the like.

2. Description of the Prior Art

Recently, there has been developed an electronic still camera system in which an image pickup device such as a solid image pickup element or an image pickup tube is combined with a recording device using as an inexpensive magnetic recording medium having a relatively large memory capacity such as a magnetic disc or the like, whereby an object can be still photographed electronically and the still image of the object is then recorded onto the rotary magnetic recording medium, and such still image can be reproduced by means of a printer, a television system, or the like separately arranged. Also, there has been proposed a video magnetic recording system in which still images recorded in a visual recording medium such as an ordinary film, a photographic paper or the like can be photographed and then recorded onto a magnetic recording medium of the above-mentioned type.

However, in the above-mentioned electronic still camera and video magnetic recording systems, there arises a requirement for one recording unit of the magnetic recording medium, for example, a video signal once recorded in a track to be erased with the video signal being recorded again in the same track. This requirement, in most cases, is due to recording failures which are not related to the characteristics of the magnetic recording medium. For example, in an case of the electronic still camera, such recording failures include "out of errors", errors in releasing the shutter of the camera and the like; and, in the video magnetic recording system, the requirement may be caused not only by bad adjustments in the white balance, color correction, density correction or the like of a video signal recorded therein but also by editing of frames recorded in respective tracks.

Also, in order to record a video signal representing a new still image onto a magnetic disc which stores old still images, it is necessary to erase all of the video signals recorded in the magnetic disc so that rerecording can be performed satisfactorily.

When erasing a given track selectively, video signals in the given track may be substantially erased, for example, by applying erase signals having a higher frequency than the band of the video signals.

In one of the conventional erase methods, there is employed a band ranging from 0 MHz to 12 MHz. Specifically, a band of 2.5 MHz or lower is used for line sequential color difference signals and a band of higher than 2.5 MHz is used for brightness signals. In this method, 1 field of video signals are recorded into 1 track using a frequency modulation technique. When erasing a track in which the video signals having such frequency spectra are recorded, the video signals in the track may be erased substantially by applying, for example, erase signals having a frequency on the order of 10 MHz for a given period of time. Also, erase signals having a plurality of frequencies may be used. For example, first, an erase signal on the order of 10 MHz may be applied for a given period of time and subsequently another erase signal on the order of 20 MHz may be applied for a given period of time. However, from the results of experiments by the inventors, in either of the above-mentioned conventional erasing methods, the video signals recorded in a given track can not be erased effectively, that is, to such a degree that satisfactory rerecording is possible.

Further, in a method disclosed in Japanese patent application No. 60-45748, the discrete frequency values described above are not used, but frequencies are varied successively from lower frequencies to higher frequencies so as to carry out such an erasing operation. In addition, there is known a direct current erasing method in which an erasing direct current gradually decreasing in level in synchronization with a 1 V (that is, 1 field) period of a recorded video signal recorded is applied to a magnetic head. However, as well known, since a signal having a lower frequency component will magnetize a magnetic recording material layer down to the comparatively deeper position thereof, in order to erase the magnetized recording material layer to a satisfactory degree, it is necessary to apply an erase signal having a lower frequency at sufficiently long frequency sweep cycles. As a result of this, in order to erase the recorded video signals effectively, a long time is required. For example, a fairly long time, e.g., about 50 seconds is necessary to erase the video signals recorded in all of 50 tracks provided in a video disc having a diameter of 47 mm.

SUMMARY OF THE INVENTION

The present invention aims at eliminating the drawbacks found in the above-mentioned prior art electronic still camera and video magnetic recording system.

Accordingly, it is an object of the present invention to provide a magnetic record erase circuit which is capable of erasing signals recorded in a rotary magnetic recording medium such as a magnetic disc or the like in an effective manner and in a short time.

In order to accomplish the above object, according to the invention, there is provided a magnetic record erase circuit which comprises recording means adapted to drive a rotary magnetic recording medium and to magnetically record frequency signals such as video signals or the like in each of the recording units of the rotary magnetic recording medium, erase signal generation means adapted to generate erase signals and supply them to the recording means, and control means adapted to control the erase signal generation means and vary the frequency of the generated erase signals in stages in synchronization with the rotation of the rotary magnetic recording medium, whereby the stage-wise varied erase signals can be applied to each of the recording units of the rotary magnetic recording medium.

According to another aspect of the present invention, there is provided a magnetic record erase circuit which comprises recording means including a magnetic head and adapted to rotatively drive a rotary magnetic recording medium and record a plurality of multiplexed frequency signals such as video signals in each of the tracks provided in the rotary magnetic recording medium, erase signal generation means adapted to generate erase signals and supply them to the recording means, current setting means for setting the current values of the erase signals, and control means which, when signals recorded in a track are to be erased, controls the erase signal generation means and current setting means such that the frequency of the erase signals can be varied in stages in the frequency range from a first frequency lower than the upper limit of the band of the recording frequencies of the magnetic head and higher than the center frequency of the frequency signal that has the lowest frequency among the above-mentioned plurality of frequency signals, to a second frequency higher than the upper limit of the band of the recording frequencies of the magnetic head, and also that at least the current value of the first frequency of the erase signals is higher than the optimum recording current value of the magnetic head.

Also, it is another object of the invention to provide a magnetic record erase circuit which is capable of erasing recorded signals over all tracks in a short time and effectively to such a degree that signals recorded in a rotary magnetic recording medium can be recorded again satisfactorily.

In attaining this object, according to the invention, there is provided a magnetic record erase circuit which comprises recording means including a magnetic head and adapted to rotatively drive a rotary magnetic recording medium and record a plurality of multiplexed frequency signals such as video signals or the like in each of the tracks provided in the rotary magnetic recording medium, magnetic head shift means for shifting the magnetic head in the radial direction of the rotary magnetic recording medium, erase signal generation means adapted to generate erase signals and supply them to the recording means, current setting means for setting the current values of the erase signals, and control means which, when the recorded signals are to be erased, controls the above-mentioned recording means, magnetic head shifting means, erase signal generation means and current setting means in such a manner that the frequency of the erase signals is varied in stages and the current values of the erase signals are higher than the optimum recording current value of the magnetic head, and that in every stage of the stage-wise variations of the frequencies of the erase signals erase signals having a given frequency are supplied to the magnetic head and, while the magnetic head is being shifted in the radial direction of the rotary magnetic recording medium, new signals are recorded each time through all of the tracks.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a magnetic record erase circuit according to the present invention with reference to the accompanying drawings.

Figure 1:
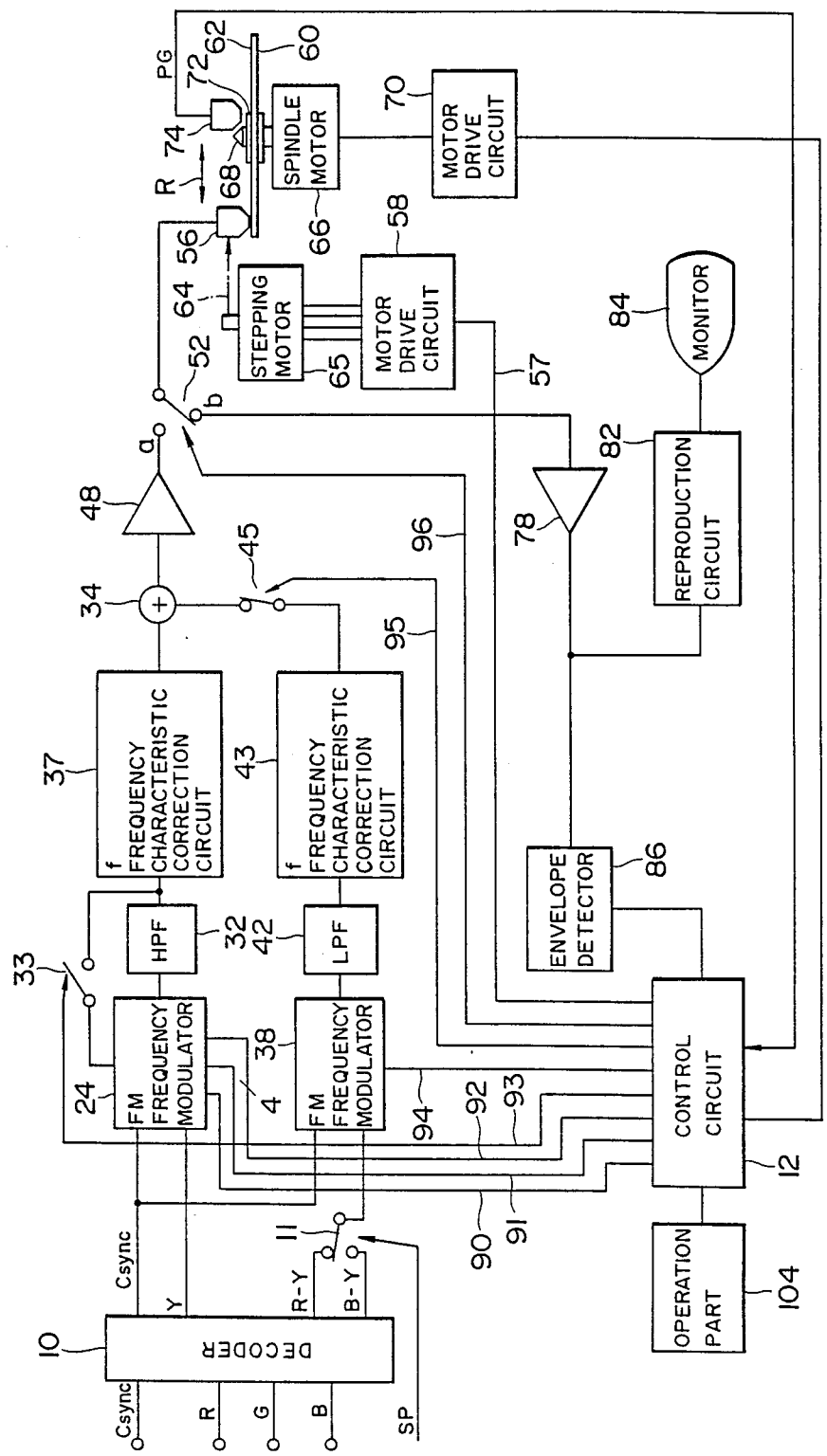
FIG. 1 is a block diagram showing the whole structure of a magnetic recording/reproducing apparatus to which the present invention is applied.

Referring first to FIG. 1, there is illustrated a general structure of a magnetic recording/reproducing apparatus to which the present invention is applied. In this figure, primary color signals R, G, B and a composite synchronizing signal $C_{sync}$ that are output from a television camera or other similar signal generating means are converted by a decoder 10 into a brightness signal Y and color difference signals R-Y, B-Y. The color difference signals R-Y, B-Y output from the decoder 10 are input via an analog switch 11 into a frequency modulator 38.

Figure 2:
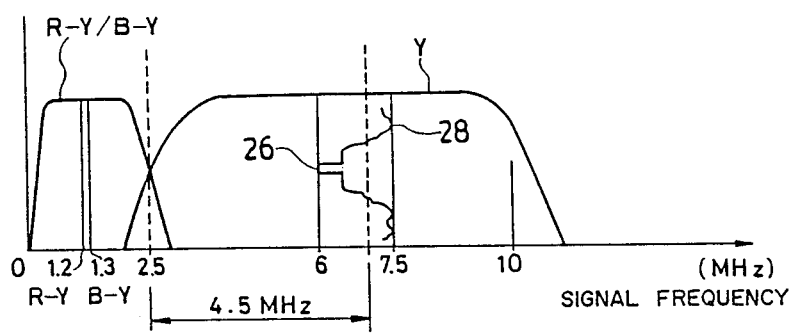
FIG. 2 is a characteristic view showing an example of the frequency spectra of video signals.

The analog switch 11 is adapted to be switched alternately every horizontal scan period (H) by means of a switching pulse SP and also to generate a line sequential color difference signal according to the color difference signals R-Y and B-Y. Another frequency modulator, designated by 24, is adapted to frequency modulate the brightness signal Y and, as described in detail later, to generate an erase signal. The signal band spectrum thereof, as shown in FIG. 2, is set such that a sync chip level 26 is 6 MHz and a white peak level 28 is 7.5 MHz with 7 MHz being substantially a center frequency therebetween. A frequency modulated brightness signal output from the frequency modulator 24 is passed through a high-pass filter (HPF) 32, is then corrected in the frequency axis thereof by a frequency characteristic correction circuit 37, and is input to a mixing circuit 34. The high-pass filter 32 has a frequency characteristic to allow signals having frequencies of about 2.5 MHz or higher to pass therethrough. Also, in the illustrated embodiment, the signals that pass through the high-pass filter 32 can be bypassed by means of an analog switch 33 which can be turned on or off by a control signal output from a conrol circuit 12. The frequency modulator 38 is adapted to frequeny modulate the line sequential color difference signal input via the analog switch 11. The signal band spectra thereof, as shown in FIG. 2, are 2.5 MHz or lower, the center frequency of the color difference signal R-Y is set to 1.2 MHz and the center frequency of the color difference signal B-Y is set to 1.3 MHz, respectively. The frequency modulated line sequential color difference signal output from the frequency modulator 38 is passed through a low-pass filter 42, is corrected in the frequency axis thereof by a frequency characteristic correction circuit 43, is passed through an analog switch 45 which can be turned on or off in response to a control signal 95 output from the control circuit 12, and is then input to the mixing circuit 34. The low-pass filter 42 is provided with a frequency characteristic to transmit therethrough signals with frequencies of about 2.5 MHz or lower. It should be noted here that the composite synchronizing signal $C_{sync}$ is also input to the frequency modulators 24 and 38.

The above-mentioned mixing circuit 34 is adapted to mix the frequency modulated brightness signal output from the frequency characteristic correction circuit 37 with the frequency modulated line sequential color difference signal output from the frequency characteristic correction circuit 43 to compose them into a frequency modulated video signal for recording, and the output signal of the mixing circuit 34 is input to a recording amplifier 48. The frequency modulated video signal for recording that is output from the recording amplifier 48 is passed through an analog switch 52 which can be switched in response to a control signal 96 output from the control circuit 12 and is then supplied to a magnetic head 56.

As shown conceptually by a one-dot chained line 64, the magnetic head 56 can be moved by a stepping motor 65 along the recording surface 62 of a magnetic disc 60 is the radial direction R thereof. A drive pulse having 4 phases A, $\overline{A}$, B, $\overline{B}$ is applied to motor 65, which allows a motor drive circuit 58 to perform a 1-2 phase excitation, the motor drive circuit 58 being operable on receiving a stepping motor drive signal 57 composed of 8 bits and output from the control circuit 12. The shifting direction of the magnetic head 56 is determined by the direction of rotation of the stepping motor 65 and the shift distance of the magnetic head 56 is proportional to the angle of rotation of the stepping motor 65. For example, for 1 pulse of shift pulses of the stepping motor 65, the stepping motor 65 is rotated approximately 18° and, as a result of this, the magnetic head 56 is shifted approximately 5 $\mu$m. Thus, 20 shift pulses can move the magnetic head 56 100 $\mu$m (1 track).

Figure 3:
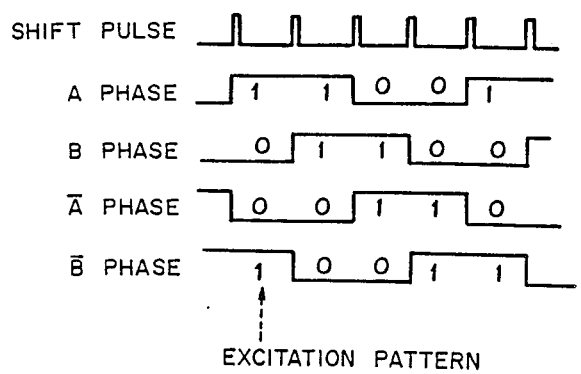
FIG. 3 is a waveform view showing the relationship between the drive pulse of a stepping motor and an excitation pattern.

It should be noted here that 1 shift pulse, as shown in FIG. 3, varies an excitation pattern once that is formed by a drive pulse with 4 phases A, $\overline{A}$, B, $\overline{B}$. In order to shift the magnetic head 56 in the forward direction, at each of the shift pulses the excitation pattern may be varied in the order of 1001→1100→0110→0011, while in order to move the magnetic head 56 in the reverse direction the excitation pattern may be changed in the reverse order.

The magnetic disc 60 is removably mounted on a shaft of rotation 68 of a spindle motor 66. The spindle motor 66 is rotatively driven by a motor drive circuit 70 and is rotated constantly at a given speed, in this embodiment, at 3,600 rpm, using frequency signals which are obtained from the frequency signal generation portion of the motor drive circuit 70.

Also, each of tracks formed on the magnetic disc 60 is composed of a recording track area for recording of signals and a guard band area to separate the track from its adjacent track. The width of the recording track area W1 is about 60 $\mu$m and the width of the guard band area W2 is about 40 $\mu$m.

The magnetic disc 60 has a core 72 and there is disposed a phase detector 74 in the neighborhood of the core 72. The phase detector 74 is adapted to detect a timing mark formed in the core 72 and generate 1 pulse of phase synchronizing signal PG each time the magnetic disc 60 is rotated one complete revolution. The control circuit 12 uses the phase synchronizing signal PG to control the motor drive circuit 70 so as to adjust the rotational phase of the magnetic disc 60.

The magnetic head 56 is a recording and reproducing head in this embodiment and, in the reproducing operation thereof, the reproduced frequency modulated video signal is input via the contact b of the analog switch 52 into a reproduction amplifier 78. The reproduced frequency modulated video signal that is output from the reproduction amplifier 78 is demodulated in a reproduction circuit 82, and subsequently the demodulated video signal is input to a video monitor device 84. This makes it possible to reproduce t--an image from the frequency modulated video signal recorded in the magnetic disc 60. It should be noted here that the magnetic head 56 is a single type of magnetic head and provided with a head gap of about 60 $\mu$m.

Figure 4:
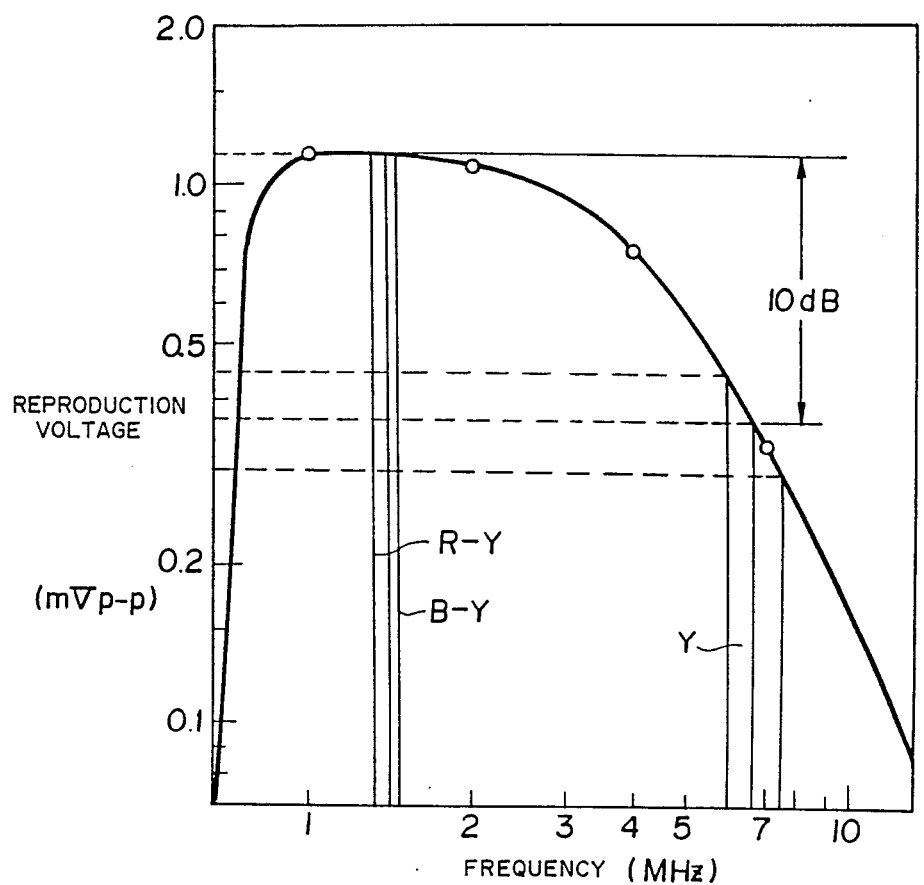
FIG. 4 is a frequency characteristic view showing the reproduction characteristic of a magnetic head.

Now, in this embodiment, the magnetic head 56 is provided with a reproducing characteristic as shown in FIG. 4. In this figure, the abscissa represents a frequency and the ordinate represents a reproducing voltage. The magnetic head 56 has a recording frequency band ranging from about 0.5 MHz to 7.5 MHz and the reproducing voltages of the magnetic head 56 are about 1.15 mVp-p at the center frequency (1.25 MHz) of the frequency modulated line sequential color difference signal and about 0.36 mVp-p at the center frequency (6.75 MHz) of the frequency modulated brightness signal. That is, among the frequency modulated video signals that are recorded in the magnetic disc 60, the FM(frequency modulated) line sequential color difference signal is reproduced at a level about 10 dB higher than the FM (frequency modulated) brightness signal in voltage.

The reproduced FM (frequency modulated) video signal that is output from the reproduction amplifier 78 is also input to an envelope detector 86 which is adapted to detect the envelope of the FM video signal read out from the magnetic disc 60 by the magnetic head 56. The envelope detection signal that is output from the envelope detector 86 is used to search the tracks on the magnetic disc 60. A position in which the envelope detection signal shows its peak when the magnetic head 56 is moved in the radial direction R of the magnetic disc 60 is the center of the track in which the FM video signal is recorded. The control circuit 12 controls the motor drive circuit 58 in accordance with a signal from the envelope detector 86, so that it performs a tracking control to position the magnetic head 56 on the center of a given track and also checks the recording track.

Figure 5:
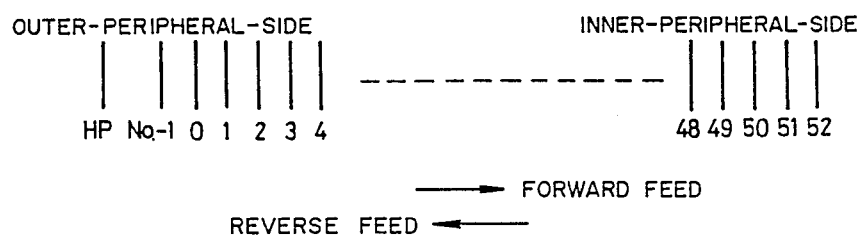
FIG. 5 is a view showing the track positions and home position of a magnetic disc.

Referring now to FIG. 5, there is shown a relation between the tracks formed in the magnetic disc 60 and the home position HP (an original position or a wait position) of the magnetic head 56. A total of 50 tracks are provided concentrically on the magnetic recording surface 62 of the magnetic disc 60 and the tracks are respectively given track Nos. ranging from No. 1 to No. 50 sequentially from the outermost track. Also, besides the above-mentioned 50 tracks, on the recording surface 62 of the magnetic disc 60 there are formed several preliminary tracks which are respectively located both inwardly of the track No. 50 and outwardly of the track No. 1. These preliminary tracks are used to record other signals that the above-mentioned video signals, for example, data signals, or they are used in place of one or more defective tracks of the 50 tracks No. 1–No. 50 into which the video signals cannot be recorded normally. The preliminary tracks are given track Nos. logically following the main 50 tracks, that is, the preliminary tracks located outside the track No. 1 are given track No. 0, No. -1—sequentially from the adjacent track to the track No. 1, and the preliminary tracks located inside the track No. 50 are given No. 51, No. 52—sequentially from the adjacent track to track No. 50. The home position HP is situated in the outer-most peripheral side of the magnetic disc 60. The home position HP is not given to the magnetic disc 60, but it is a limit position alloted on the shift path of the magnetic head 56. The home position HP can be sensed by a home position switch. Shifting the magnetic head 56 from the outer peripheral side of the magnetic disc 60 is a forward feed and shifting the magnetic head 56 in the opposite direction is a reverse feed.

The control circuit 12 supervises and controls the operations of the whole system and directions from an operator are input to the control circuit 12 from an operation part 104 by means of key operations. The operation part 104 includes a video key which is used to direct or instruct recording onto the magnetic disc 60, a head shift key used to direct the shifting of the magnetic head, a track erase key used to direct the recording erasure in a track unit, an all track erase key used to direct the erasure of the signals recorded in all tracks, and so on.

Figure 6:
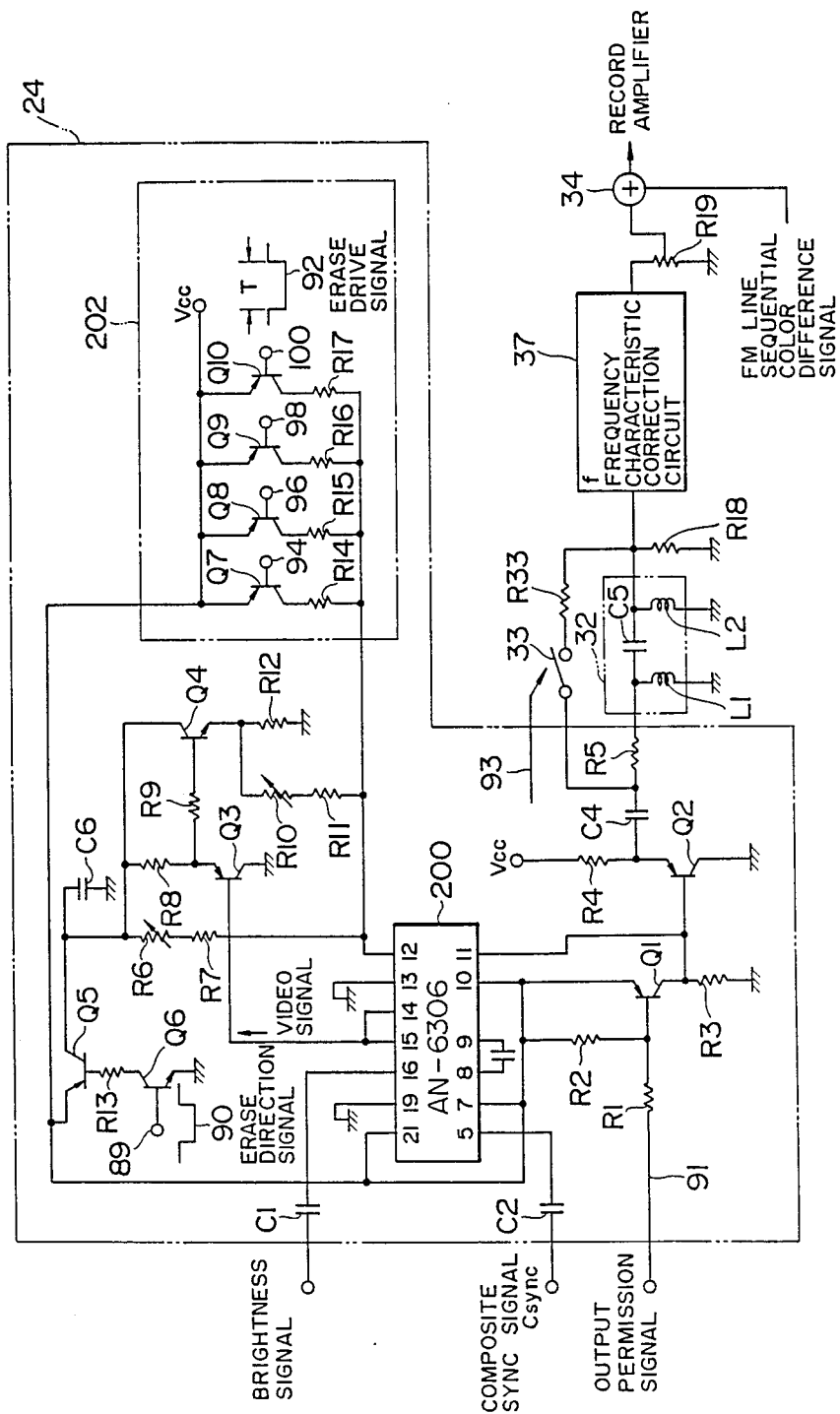
FIG. 6 is a circuit diagram showing a structural example of a frequency modulation device for a brightness signal shown in FIG. 1.

Referring next to FIG. 6, there are shown a circuit construction of the frequency modulator 24 for the brightness signals Y as well as a general structure of the high-pass filter 32 and the frequency characteristic correction circuit 37. The frequency modulator 24 includes a frequency oscillator 200 and, in this embodiment, this can be realized by an integrated circuit such as an IC Model AN-6306 supplied from Matsushita Electric Industrial Co., Ltd. This integrated circuit 200 includes a multivibrator and the oscillation frequency thereof depends on the capacitance of a capacitor C3 connected between two terminals 8 and 9 as well as on a control current which flows into a terminal 12.

The brightness signal Y that is output from the decoder 10 is input via a capacitor C1 into the terminal 16 of the integrated circuit 200 and the composite synchronizing signal Csync is input via a capacitor C2 into the terminal 5 of the integrated circuit 200. In accordance with the signals input to the terminals 16 and 5 thereof, the integrated circuit 200 outputs the frequency modulated brightness signal from the terminal 11 thereof, as described later. The frequency modulated brightness signal is input to the base terminal of a transistor Q2 and then is output by the transistor Q2 from the emitter terminal of the transistor Q2 via a capacitor C4 connected directly to the emitter terminal of the transistor Q2 and a resistance R5 to a following high-pass filter 32.

The high-pass filter 32 is composed of two coils L1 and L2 and a capacitor C5 in a $\pi$-shaped form and a resistor R18 is connected externally of the output side of the high-pass filter 32. An erase signal to be described later does not pass through the high-pass filter 32, but is input to the frequency characteristic correction circuit 37 via an analog switch 33 and a resistance R33 both connected between the output side of the capacitor C4 and the output side of the high-pass filter 32. The resistance values of a resistor R5 of the frequency modulator 24 and the above-mentioned resistance R33 are respectively determined such that the current value of the erase signal output via the analog switch 33 may be 1.2 times or more that of the optimum recording current value of the magnetic head 56. A variable resitance R19 is parallel connected to the output side of the frequency characteristic correction circuit 37 and the variable resistance R19 can be adjusted so that the voltage level of the frequency modulated brightness signal can be set about 20 dB higher than that of the frequency modulated line sequential color difference signal.

Also, the control circuit 12 controls the FM brightness signal output from the terminal 11 the integrated circuit 200 or by inputting an output permission signal 91 to permit the output of the erase signal via a resistance R1 to the base terminal of the transistor Q1 which signal 91 is then input via the collector terminal of the transistor Q1 into the base terminal of the transistor Q2. As a result, for example, when the output permission signal 91 output from the control circuit 12 goes to the low level, then the transistor Q1 conducts, with the result that the transistor Q2 is cut off to thereby prevent the signal from being output from the terminal 11 of the integrated circuit 200.

The current that flows into the terminal 12 of the integrated circuit 200 is regulated mainly by a variable resistance R6 and a resistance R7 due to the conduction of the transistor Q5, a variable resistance R10 and a resistance R11 due to the conduction of the transistor Q4, and the current to be supplied to the terminal 12 of the integrated circuit 200 from an integrated circuit drive circuit 202 which will be described later. The above-mentioned variable resistor R6 and resistor R7 are adjusted so that the sync chip level 26 of the brightness signal Y can be set at 6 MHz according to the value of the capacitor C3. Similarly, the variable resistor R10 and the resistor R11 are adjusted such that the white peak level 28 of the brightness signal Y can be set at 7.5 MHz, that is, the difference between the sync chip level 26 or 6 MHz and the white peak level 28 or 7.5 MHz is regulated to be 1.5 MHz.

While the transistor Q3 is cut off completely, the current that is determined by the variable resistor R6 and the resistor R7 is allowed to flow into the terminal 12 of the integrated circuit 200 and an FM brightness signal having a center frequency of 6 MHz is output to the terminal 11 thereof as a sync chip. When the level of the brightness signal Y input from the decoder 10 into the terminal 16 of the integrated circuit 200 is varied, then the signal levels at the two terminals 14 and 15 of the integrated circuit 200 are caused to vary accordingly, so that the transistor Q3 is caused to conduct accordingly. The conduction of the transistor Q3 causes the transistor Q4 to conduct, with the result that the output current flowing from the emitter of the transistor Q4 through the following variable resistor R10 and resistor R11 is supplied to the terminal 12 of the integrated circuit 200. Therefore, the current flowing into the terminal 12 of the integrated circuit 200 can be controlled according to the degree of conduction of the transistor Q4, whereby the frequency is, that is, center frequency of the FM brightness signal output to the terminal 11 of the integrated circuit 200 can vary in the range from 6 MHz to 7.5 MHz.

Now, at the terminal 12 of the integrated circuit 200, there is further provided an integrated circuit drive circuit 202 (this is referred to as an IC drive circuit hereinafter) which is adapted to set up the frequencies of the signals that are used to erase the recorded signals.

The above-mentioned IC drive circuit 202 comprises four transistors Q7, Q8, Q9, Q10 and four resistors R14, R15, R16, R17 respectively connected to the collector terminals of the above-mentioned transistors. In this embodiment, when the record signals are erased, the current to be determined by the resistors R14, R15, R16 and R17 while the associated transistors Q7, Q8, Q9 and Q10 are conducting is allowed to flow into the terminal 12 of the integrated circuit 200. According to the values of the respective currents flowing into the terminal 12, the integrated circuit 200 outputs from the terminal 11 thereof, for example, an erase signal having a frequency of about 7 MHz (a first frequency) when the transistor Q7 is caused to conduct, an erase signal having a frequency of about 10.5 MHz when the transistor Q8 is caused to conduct, an erase signal having a frequency of about 14 MHz when the transistor Q9 is caused to conduct, and an erase signal having a frequency of about 20 MHz (a second frequency) when the transistor Q10 is caused to conduct.

As mentioned above, the first frequency of the erase signal is set at about 7 MHz which is in the neighborhood of the upper limit of the frequencies that can be recorded by the magnetic head 56. The frequencies of the erase signals are set such that they increase stepwise within the range from the first frequency to the second frequency.

Also, when the erase signals are to be output from the integrated circuit 200, in order that the current flowing into the terminal 12 of the integrated circuit 200 can not be affected by the brightness signal Y at the terminals thereof 14 and 15, an erase direction signal 90 of low level is output from the control circuit 12 to the base terminal 89 of the transistor Q6 to cause the transistor Q3 to be cut off.

Erase drive signals 92 are supplied sequentially from the control circuit 12 to the respective base terminals 94, 96, 98 and 100 of the transistors Q7, Q8, Q9 and Q10 of the IC drive circuit 202.

Figure 7:
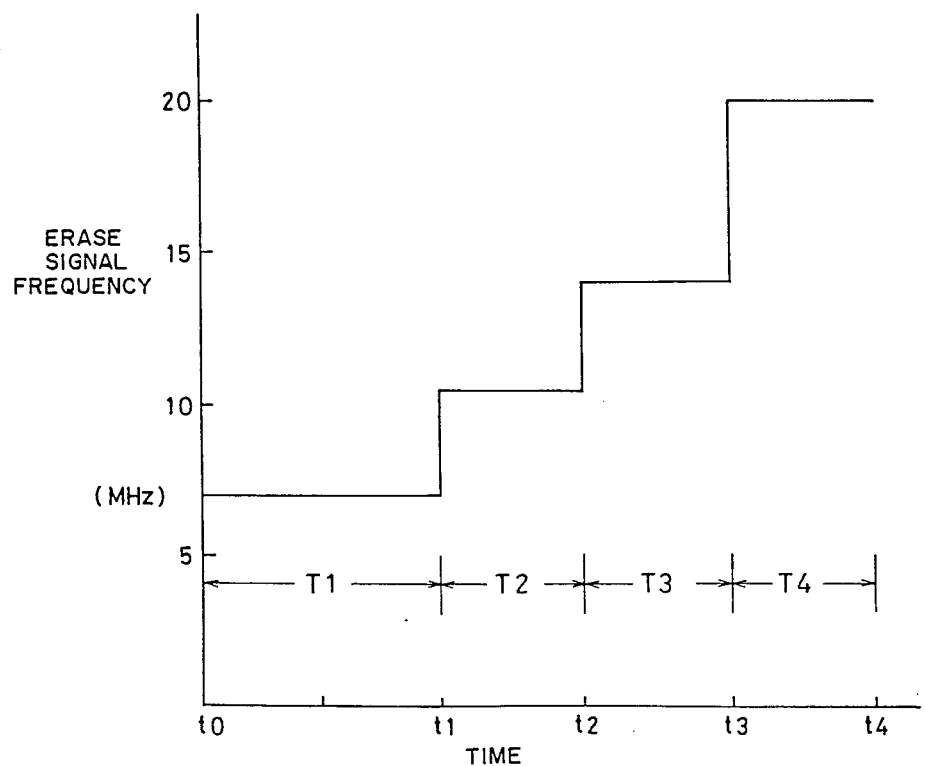
FIG. 7 is an explanatory view showing an example of the output conditions of erase signals output from the brightness signal frequency modulation device shown in FIG. 6.

In this embodiment, for example, in order to erase all video signals that are recorded in 50 tracks, that is, track No. 1 through track No. 50, the control circuit 12, in response to the operation of the all track key in an operation part 104, supplies the erase drive signal 92 of low level to the base terminal 94 of the transistor Q7 during a period T1 ranging from a time t0 to a time t1 according to the speed of shifting of the magnetic head 56, as shown in FIG. 7. This causes the transistor Q7 to conduct, with the result that a given value of current is allowed to flow into the terminal 12 of the integrated circuit 200 and an erase signal with a frequency of about 7 MHz is output from the terminal 11 thereof during the period T1. Afterwards, to erase all video signals in the 50 tracks likewise, during a period T2 which is shorter than the above-mentioned period T1 and ranges from the time t1 to a time t2, the erase drive signal 92 is supplied from the control circuit 12 to the base terminal 96 of the transistor Q8 of the frequency modulator 24. As a result of this, an erase signal with a frequency of about 10.5 MHz is output from the terminal 11 of the integrated circuit 200 during the period T2. Further, during a period T3 ranging from the time T2 to a time t3, the erase drive signal 92 is supplied from the control circuit 12 to the base terminal 98 of the transistor Q9 of the frequency modulator 24 and, during a period T4 ranging from the time t3 to a time t4, the erase drive signal 92 is supplied from the control circuit 12 to the base terminal 100 of the transistor Q10 of the frequency modulator 24, with the result that, from the terminal 11 of the integrated circuit 200 of an frequency modulator 24, the erase signal with a frequency of about 14 MHz is output only during the period T3 and the erase signal with a frequency of about 20 MHz is output only during the period T4, sequentially. These erase signals are sequentially amplified by the transistor Q2. The output level thereof is set at the same level as that of the normal FM brightness signal and the erase signal thereof is output via an analog switch 33, so that a current having a value about 1.2 times the value of the optimum recording current can be supplied to the magnetic head 56.

Figure 8:
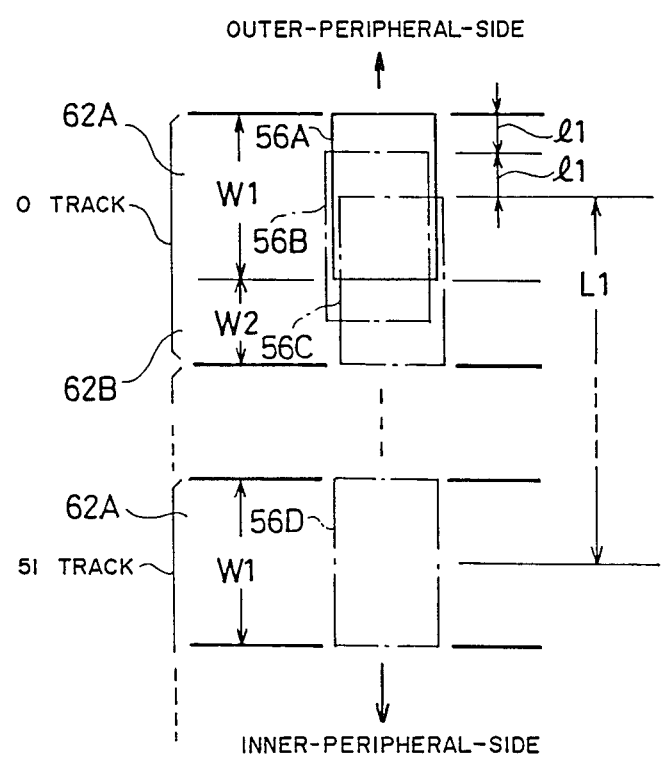
FIG. 8 is an explanatory view showing the shifting operation of the magnetic head in the magnetic recording/reproducing apparatus shown in FIG. 1.

Next, in connection with FIG. 8, description will be given of the operation of the magnetic recording/reproducing apparatus constructed in the above-mentioned manner. The spindle motor 66 is constantly rotating at a given speed of 3,600 rpm. The analog switch 52 is normally held in the connected state as shown in FIG. 1 (contact b). Therefore, if a video signal is recorded in the magnetic disc 60, then the image corresponding to the video signal can be reproduced by a monitor device 84 through the reproduction amplifier 78 and reproducing circuit 82.

The head shift key of the operation part 104 is operated to position the magnetic head 56 at a position where an empty track of the magnetic disc 60 is situated. This positioning is performed in such a manner that the control circuit 12 controls the motor drive circuit 58 in response to the operation of the head shift key. Whether the track is empty (no signal is recorded) or not can be determined by the control circuit 12 detecting the reproduction output of the magnetic head 56 through the envelope detector 86.

When an magnetic head 56 is positioned at the empty track, the operator operates the video key of the operation part 104. As a result of this, the composite synchronizing signal Csync and brightness signal Y output from the decoder 10 are first frequency modulated by the frequency modulator 24 respectively and the FM brightness signal output from the frequency modulator 24 is input via the high-pass filter 32 and frequency characteristic correction circuit 37 into the mixing circuit 34. Also, the chroma signals C, that is, the color difference signals R-Y, B-Y are converted by the analog switch 11 into line sequential color difference signals and are then frequency modulated by the frequency modulator 38. The FM line sequential color difference signal that is output from the frequency modulator 38 is input via the low-pass filter 42 and frequency characteristic correction circuit 43 into the mixing circuit 34, where it is mixed with the FM brightness signal.

Correspondingly to the above operations, the control circuit 12 outputs the control signal 96 to switch the analog switch 52 to the contact a thereof opposed to the shown contact b only during 1 vertical scan period (1 V) from the phase synchronizing signal PG. As a result of this, the FM video signal for recording that is output from the mixing circuit 34 is supplied via the recording amplifier 48 nd analog switch 52 to the magnetic head 56 and thus 1 field of video signal is recorded into one of the tracks provided on the magnetic disc 60. The reproduction output of the magnetic head 56 is visualized in the monitor device 84 via the analog switch 52 that has switched back to the shown state (the contact b thereof is connected), which makes it possible to confirm the recording state of the track. In other words, by repeating these operations, video signals of one field can be sequentially recorded into the empty tracks of the magnetic disc 60.

When all of the video signals recorded into the magnetic disc 60 in this manner are to be erased, for example, then the all track erase key in the operation part 104 is operated. In response to the operation of the all track erase key, the control circuit 12 carries out the tracking control to locate the magnetic head 56 on the center of, for example, the No. 0 track. Next, the control circuit 12 first outputs the control signal 96 to thereby change over the analog switch 52 to the contact a thereof, and further outputs the control signal 95 to thereby open the analog switch 45 so as to prevent the FM line sequential color difference signal from being input to the mixing circuit 34. Then, from the control circuit 12, during the period T1 ranging from the time t0 to the time t1 the erase direction signal 90, output permission signal 91 and control signal 93 are output to the frequency modulator 24, and further the erase drive signal 92 is output to the base terminal 94 of the transistor Q7 of an IC drive circuit 202. As a result of this, the erase signal having a frequency of about 7 MHz is output from the terminal 11 of the integrated circuit 200 of the frequency modulator 24, and this erase signal is supplied via the analog switch 52 to the magnetic head 56. Also, correspondingly to this, the control circuit 12 supplies to the motor drive circuit 58 the stepping motor drive signal 57 which can be used to output, for example, only 1,020 drive pulses at the rate of 300 PPS (pulses per second). In response to this stepping motor drive signal 57, the motor drive circuit 58 controls the stepping motor 65 to move the magnetic head 56 that is positioned on the center of the recording track 62A of the track No. 0 track from a position designated by reference character 56A to a position designated by 56B, that is, only by a distance l1 of approximately 15 μm during one rotation (1/60 sec.) of the magnetic disc 60, as shown in FIG. 8. Further, due to the operation of the stepping motor 65, the magnetic head 56 is shifted approximately 15 μm toward the inside periphery of the track from the position 56B to a position designated by 56C during one rotation of the magnetic disc 60. Therefore, the magnetic head 56 is shifted approximately 60 μm by the stepping motor 65 during four rotations of the magnetic disc 60 and, during this time, the erase signals are applied in a spiral over the recording track 62A and guard band 62B of the track No. 0 track. Subsequently, the motor drive circuit 58 controls the stepping motor 65 to move the magnetic head 56 to the center position (designated by 56D) of the recording track 62A of another track, that is, a track No. 51 track. As a result of this, the magnetic head 56 is moved by the stepping motor 65 a distance L1 of 5,100 μm or so in about 3.40 seconds from the center position of the recording track 62A of the track No. 0 track to the center position of the recording track 62A of the track No. 51 track. In other words, from the control circuit 12 to the base terminal 94 of the transistor Q7 of the frequency modulator 24, the erase drive signals 92 are output while the magnetic head 56 is being moved along the tracks, that is, during the period T1 on the order of 3.4 seconds.

Next, the control circuit 12 outputs the erase drive signals 92 to the base terminal 96 of the transistor Q8 of the IC drive circuit 202 during the period T2 ranging from the time t1 to the time t2, with the result that the erase signal having a frequency of about 10.5 MHz is output from the terminal 11 of the integrated circuit 200 of the frequency modulator 24 and the erase signal is then supplied via the analog switch 52 to the magnetic head 56. Correspondingly to this, the control circuit 12 supplies to the motor drive circuit 58 a stepping motor drive signal 57 which is used to output 1,020 of drive pulses to move the magnetic head 56, that is located on the track No. 51 track, in the reverse direction back to the original position of the track No. 0 track, for example, at the rate of 600 PPS. In response to the stepping motor drive signal 57, the motor drive circuit 58 controls the stepping motor 65 to shift the magnetic head 56, that is positioned in the center of the recording track 62A of the track No. 51 track, about 30 μm from the position shown by 56D toward the outside periphery thereof during one rotation of the magnetic disc 60. Also, the magnetic head 56 is shifted about 60 μm by the stepping motor 65 further toward the outside periphery thereof during two rotations of the magnetic disc 60 and, during this shifting operation, the erase signals are applied spirally to the recording 62A and the outer-periphery side track of the track No. 51 track. Afterwards, the motor drive circuits 58 controls the stepping motor 65 similarly to shift the magnetic head 56 the distance L1 from the position of the track No. 51 track to the original position of the track No. 0 track in 1.7 seconds or so and, during this shifting operation, the erase signals are applied in a spiral manner. That is, from the control circuit 12 to the base terminal 96 of the transistor Q8 of the frequency modulator 24, the erase drive signals 92 are output only during the period T2 of the order of 1.7 seconds in which the magnetic head 56 is being shifted along the tracks.

The control circuit 12 outputs the erase drive signal 92 to the base terminal 98 of the transistor Q9 of the IC drive circuit 202 during the period T3 ranging from the time t2 to the time t3. As a result of this, an erase signal with a frequency of about 14 MHz is output from the terminal 11 of the integrated circuit 200 of the frequency modulator 24, and the erase signal is then supplied via the analog switch 52 to the magnetic head 56. Correspondingly to this, the control circuit 12 supplies to the motor drive circuit 58 the stepping motor drive signal 57 which permits the output of, for example, only 1,020 forward feed drive pulses at the rate of 600 PPS. On receiving the stepping motor drive signal 57, the motor drive circuit 58 controls the stepping motor 65 to move the magnetic head 56 about 30 μm in the same manner as mentioned above from the position 56A in the track No. 0 track toward the inner periphery thereof while the magnetic disc 60 is rotated once. After that, the motor drive circuit 58 controls the stepping motor 65 similarly so that the magnetic head 56 is moved as in the above-mentioned manner in about 1.7 sec. along the tracks from the track No. 0 track to the track No. 51 track and during this movement the erase signals are applied in a spiral. That is, from the control circuit 12 to the base terminal 98 of the transistor Q9 of the frequency modulator 24, the erase drive signals are output only during the period T3 of about 1.7 seconds while the magnetic head 56 is being shifted along the tracks.

Further, the control circuit 12 outputs the erase drive signals 92 to the base terminal 100 of the transistor Q10 of the IC drive circuit 202 during the period T4 ranging from the time t3 to the time 4. As a result of this, an erase signal having a frequency of about 20 MHz is output from the terminal 11 of the integrated circuit 200 of the frequency modulator 24 and this erase signal is then supplied to the magnetic head 56 via the analog switch 52. Also, correspondingly to this, the control circuit 12 supplies to the motor drive circuit 58 a stepping motor drive signal 57 which permits the output of, for example, 1,020 reverse feed drive pulses at the rate of 600 PPS. In response to this stepping motor drive signal 57, the motor drive circuit 58 controls the stepping motor 65 so that the magnetic head 56 is shifted in the same manner as mentioned above in about 1.7 sec. from the No. 51 track along the track No. 0 track and during this shifting the erase signals are applied spirally. That is, from the control circuit 12 to the base terminal 100 of the transistor Q10 of the frequency modulator 24, the erase signals 92 are output only during the period T4 of about 1.7 sec. while the magnetic head 56 is being shifted along the tracks.

As described above, in the illustrated embodiment of the magnetic record erase circuit according to the present invention, when erasing the FM video signals recorded on the 50 tracks in the magnetic disc, first, during the period T1, an erase signal having a frequency (the first frequency) higher than that of the lowest-frequency FM chroma signal and having a current value greater than the optimum recording current value of the magnetic head is used to erase the FM chroma signals in all tracks only for 3.4 seconds or so, and, next, during the period T2 to T4, an erase signal having a frequency that is increased in three steps is used to erase the FM brightness signal in all tracks nly for 1.7 seconds or so in each stage. Therefore, the 50 tracks can be erased only in a total time of about 8.5 seconds.

As mentioned above, since the first frequency of the erase signal is set in the neighborhood of the upper limit value of the frequencies that can be recorded by the magnetic head and is also set higher than that of the lowest-frequency signal among a plurality of signals to be erased, the erasing time can be reduced.

Also, although in the above-mentioned embodiment the current value of the erase signal is set higher than the optimum recording current value of the magnetic head in the range of the first frequency (about 7 MHz) to the second frequency (about 20 MHz), the invention is not limited to this, provided that the current value of only the erase signal in at least the first frequency is set higher.

Further, due to the fact that the positions where the recording of the erase signals is started and stopped are set on the track in which video signals representing still images are not recorded, the video signal will not suffer from ill effects resulting from the damage of the magnetic disc that may occur when the magnetic head strikes against the magnetic disc or the like.

In addition, in the illustrated embodiment, a circuit that generates the erase signals is provided in the frequency modulator 24 for the brightness signals. This construction is advantageous in that the frequency oscillation circuit to frequency modulate the brightness signal can be used. However, this is not always limitative, but such erase signal generation circuit may be provided in the frequency modulator 38 for the color difference signals, or there may provided another oscillation circuit separate from the above-mentioned frequency modulators. It should be noted here that use of the existing frequency modulators has an advantage that the circuit configuration is not complicated.

Next, another embodiment of the invention will be described below. In this embodiment, when erasing signals recorded in 1 track on a magnetic disc, the frequency of an erase signal is varied in steps in the range from a first frequency lower than the upper limit of the recording frequencies of the magnetic head and higher than the center frequency of the lowest-frequency signal among a plurality of signals recorded in the magnetic disc to a second frequency higher than the upper limit of the above-mentioned recording frequencies of the magnetic head, and, each time the frequency of the erase signal is varied stepwise, the output of the erase signals is stopped only during a given period.

Figure 9:
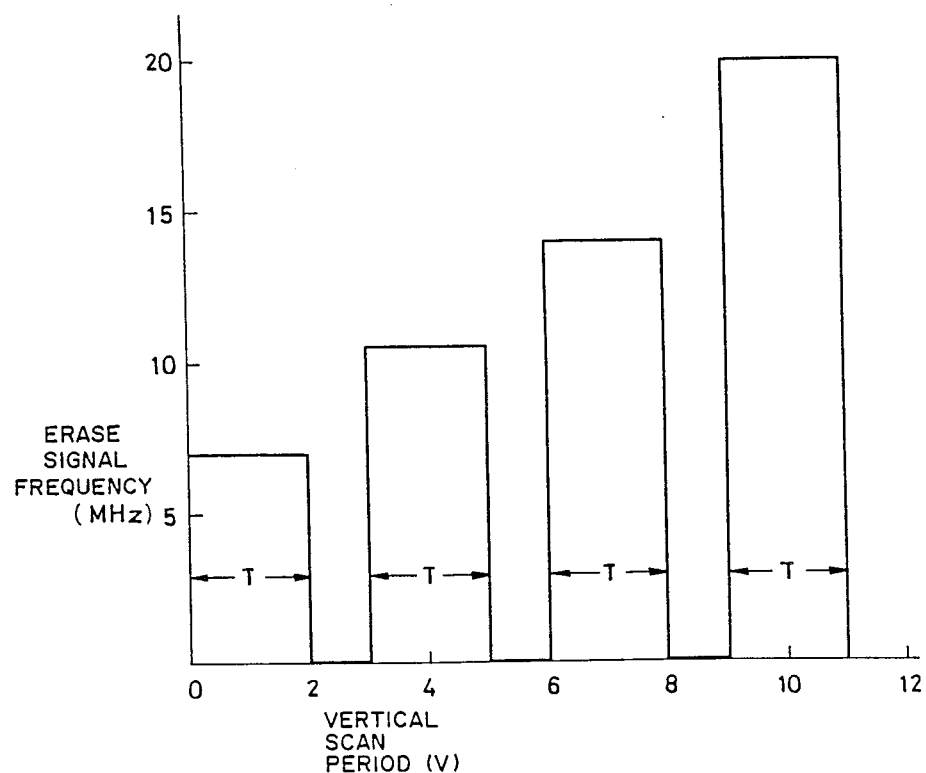
FIG. 9 is an explanatory view showing another example of the output conditions of the erase signals output from the brightness signal frequency modulation device shown in FIG. 6.

In the above-mentioned second embodiment of the invention, in response to the operation of the erase key in the operation part 104, the control circuit 12 at first supplies to the base terminal 94 of the transistor Q7 the erase drive signal 92 of low level having a pulse width T corresponding to 2 V (that is, two vertical scan periods), as shown in FIG. 9, for example. That is, in this example, the erase signal with a frequency of about 7 MHz is being output from the terminal 11 of the integrated circuit 200 during the period T ranging from 0 V to 2 V. And, during 1 V between 2 V and 3 V, the supply of the erase drive signal 92 is interrupted. Further, during the period T corresponding to 2 V between the following 3 V and 5 V, the control circuit 12 supplies the erase drive signal 92 to the base terminal 96 of the transistor Q8. As a result of this, an erase signal having a frequency of about 10.5 MHz is output from the terminal 11 of the integrated circuit 200. Subsequently, according to the erase drive signals 92 that are supplied to the respective base terminals 98, 100 of the transistors Q9 and Q10, an erase signal with a frequency of about 14 MHz is output during 2 V between 6 V and 8 V and an erase signal with a frequency of about 20 MHz is output during 2 V between 9 V and 11 V, respectively from the terminal 11 of the integrated circuit 200. These erase signals are sequentially amplified by the transistor Q2, respectively. Also, the output levels thereof are set in the same level as with an ordinary FM brightness signal. Further, by outputting these erase signals by means of the analog switch R33 and the resistor 33, a current having a value about 1.2 times or more the optimum recording current value can be supplied to the magnetic head 56. The remaining portions of the structure of the second embodiment are similar to the before-mentioned first embodiment of the invention and thus the description thereof is omitted here.

In the above-mentioned structure, for example, after 1 field of video signals are recorded in a track on the magnetic disc 60, the monitor device 84 is used to confirm the recording state of the track. In this case, when an operator wants to erase the recorded video signals, then the operator may operate the erase key in the operation part 104. In response to this operation, the control circuit 12 first outputs the control signal 96 to thereby change over the analog switch 52 to the contact a thereof and further outputs the control signal 95 to thereby control or turn off the analog switch 45, thereby preventing the FM line sequential color difference signal from being input to the mixing device 34. The control circuit 12 then outputs the erase direction signal 90, output permission signal 91 and control signal 93 to the frequency modulator 24, and the erase drive signal 92 is output four times to the IC drive circuit 202 during a time corresponding to 2 V (two vertical scan periods) at an interval of 1 V. The erase drive signal 92 is output each time from the control circuit 12 in time to synchronization with the detection of the PG signal so that switching noise may not be recorded within the signal recording region of the video signal representing the image. However, the output timing of the erase drive signal does not always have to be synchronized with the detection of the PG signal.

In response to the values of the currents that are input from the IC drive circuit 202 to the terminal 12 of the integrated circuit 200 in such a manner that they are increased stepwise at a cycle of 3 V periods, an erase signal of about 7 MHz, an erase signal of about 10.5 MHz, an erase signal of about 14 MHz and an erase signal of about 20 MHz are output sequentially from the terminal 11 of the integrated circuit 200. These erase signals are sequentially supplied through the analog switch 33, frequency characteristic correction circuit 37, mixing device 34, recording amplifier 48 and analog switch 52 to the magnetic head 56. Therefore, the erase signal of about 7 MHz that occurs first and has the lowest frequency operates effectively on the erasure of especially the FM line sequential color difference signal among the FM video signals already recorded in the track, and subsequently the FM brightness signals are sequentially erased by the erase signals that are stepwise increased in frequency.

As described above, in the second embodiment of the magnetic record erase circuit according to the invention, in order to erase the FM video signals that have been recorded in the magnetic disc, at first an erase signal that has a frequency (a first frequency) higher than the center frequency of the lowest frequency FM chroma signal and a current value greater than the optimum recording current value of the magnetic head is used to erase the FM video signals only during 2 V periods, and after then the erase signal having a frequency that is increased in 3 steps up to the second frequency at an interval of 1 V period is used to erase the FM brightness signals only during 2 V periods each step. That is, 1 track, namely, the FM video signals recorded in 1 track can be erased in a total of about 11 V periods. In other words, the erase time can be reduced by setting the first frequency of the erase signal in the neighborhood of the upper limit value of the frequencies that can be recorded by the magnetic head and higher than the signal having the lowest frequency among a plurality of signals to be erased.

In the second embodiment, as in the before-mentioned first embodiment, the current value of the erase signal may be set higher than the optimum recording current value of the magnetic head with respect to at least the erase signal having the first frequency.

Also, the second embodiment is similar to the first embodiment in that the erase signal generation circuit does not always have to be provided in the frequency modulator 24 for the brightness signal, but it may be provided in the frequency modulator 38, for the color difference signal and another frequency oscillator may be provided separately from the above-mentioned frequency modulators.

Next, we will describe a third embodiment of the invention. Although the third embodiment is basically similar in structure to the magnetic recording/reproducing apparatus shown in FIG. 1, the structure of the IC drive circuit 202 in the frequency modulator 24 is slightly different and the drive timings of the respective transistors forming the IC drive circuit 202 are different when compared with the the apparatus shown in FIG. 1.

Figure 10:
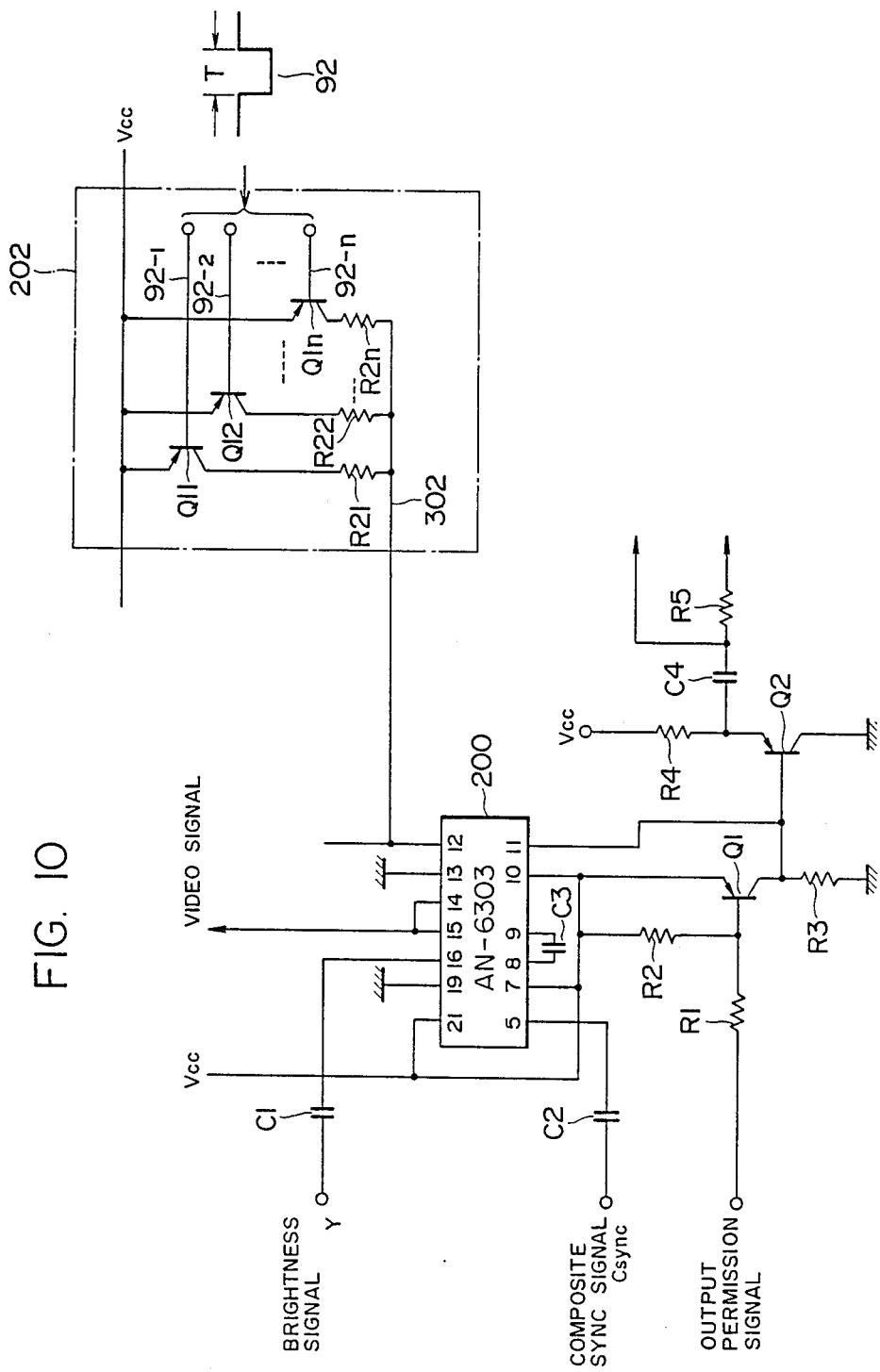
FIG. 10 is a circuit diagram showing another embodiment of an IC drive circuit included in the brightness signal frequency modulation device shown in FIG. 6.

Also, in the third embodiment, the optimum recording current value of the magnetic head 56 is supplied as the current value of the erase signal. The structure of the IC drive circuit 202 in the third embodiment is shown in FIG. 10. As shown in FIG. 10, in the IC drive circuit 202, n transistors Q11 Q12, —, Q1n are respectively connected in series to their associated resistors R21, R22, —, R2n, which are connected in parallel to a control line 302. The current of the control line 302 can be controlled according to the control signal that is input from the control circuit 12 into the base electrodes 92-1, 92-2, —, 92-n of the transistors. Thus, there is formed a current control circuit. That is, the current value determined according to the state of conduction of these transistors Q11-Q1n is supplied to the terminal 12 of the integrated circuit 200.

In the illustrated embodiment, n is 5 and thus the values of the five resistors R21, R22, —, R25 are selected such that the output frequency of the terminal 11 of the integrated circuit 200 can be varied in five steps according to the states of conduction of the five transistors Q11-Q15. For example, when only the transistor Q11 is conducting, then an erase signal of 3 MHz is output from the terminal 11; when the transistor Q12 is conducting in addition to the transistor Q11, then an erase signal of 6 MHz is output; when the transistor Q13 is conducting in addition to the transistors Q11 and Q12, then an erase signal of 12 MHz is output; when the transistor Q14 is conducting in addition to the transistors Q11, Q12, Q13, then an erase signal of 15 MHz is output; and, when the transistor Q15 is conducting in addition to the transistors Q11, Q12, Q13, Q14, then an erase signal of 20 MHz is output from the terminal 11 of the integrated circuit 200. In this manner, it is effective to form the the current control circuit such that the output frequencies can be 3 frequencies or more.

To the respective control terminals 92-1~92-n of the IC drive circuit 202 there is supplied from the control circuit 12 a control signal which allows the transistors Q11-Q1n to conduct. In the illustrated emodiment, the control circuit 12 generates this control signal in response to the operation of the erase key in the operation part 104 and this generation of the control signal is synchronized with the phase synchronizing signal PG.

On receiving the phase synchronizing signal PG (FIG. 11) from the phase detector 74 together with the rotation of the magnetic disc 60, the control circuit 12 energizes the base electrode 92-1 of the transistor Q11 synchronously with the phase sync. signal PG, with the result that the transistor Q11 is allowed to conduct and also a given current is supplied via the collector resistor R11 to the terminal 12 of the integrated circuit 200. The integrated circuit 200 then outputs an erase signal 312 having a frequency to be determined by the current supplied to the terminal 12, that is, in the illustrated embodiment, 3 MHz from the output terminal 11 of the integrated circuit 200. The 3 MHz erase signal 312 is then amplified by the transistor Q2 and is output to the terminal 30. The output level thereof may be the same level as the output level of the ordinary brightness signal Y, and, therefore, a current of the optimum recording level can be supplied to the magnetic head 56.

Thus, when given periods, for example, 3 V periods have elapsed, the control circuit 12 energizes the base electrode of the transistor Q12 synchronously with the phase sync signal PG as well. As a result of this, the transistor Q12 also conducts and thus a current having a given value to be determined by the collector resistor 22 is added to the current from the resistor 21 and is then supplied to the terminal 12 of the integrated circuit 200. In response to this, the integrated circuit 200 outputs from the terminal 11 thereof an erase signal 312 having a frequency to be determined by the current input to the terminal 12, that is, 6 MHz in the illustrated embodiment.

Figure 11:
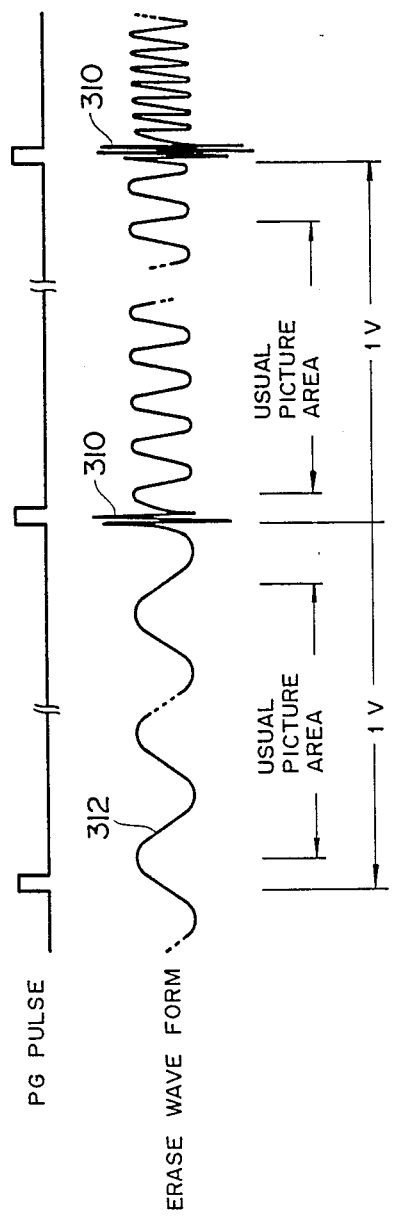
FIG. 11 is an explanatory view showing the output conditions of erase signals output from the brightness signal frequency modulation device to which the IC drive circuit shown in FIG. 10 is applied.

As shown in FIG. 11, the drive timing of the transistor Q12 is set in the area of the video signal track other than the usual picture area thereof. That is, the energization of the base electrode of the transistor Q12 is initiated during the period other than the usual picture area including the vertical synchronizing signal of the video signal. In the illustrated embodiment, due to this setting of the drive timing, there is eliminated the possibility that a spike noise 310 contained in the erase signal 312 may be recorded in the track to be erased as a result of the initiation of driving of the transistors Q11-Q1n.

In more detail, generally, recording into the respective tracks of the magnetic disc 60 is performed in such a manner that the usual picture areas of the video signals in the respective tracks have the same rotational phase with one another. For this reason, each of the tracks is constructed such that 1 field of video signals can be recorded into 1 track synchronously with the detection of the phase sync signal PG. Thus, if the erase signal 312 is constructed such that the frequency thereof is switched at a given phase of rotation synchronously with the phase sync signal PG, then there is eliminated the possibility that, if the video signals are recorded in the erased track, the spike noise 310 remaining in the video signal will be included in the usual picture area of the video signal. As a result of this, there is no possibility that the spike noise 310 may be included in the video signal that is reproduced afterwards.

In this manner, when the erase signal 312 having a frequency of, for example, 6 MHz is output during 1 V period, then the control circuit 12 energizes the base electrode of a transistor Q13 (not shown) synchronously with the phase sync signal PG as well. Consequently, likewise in the above-mentioned manner, the transistor Q13 is allowed to conduct and thus a current having a given value to be determined by a collector resistor R23 is added to the currents from the resistors R21 and R22 and is then supplied to the terminal 12 of the integrated circuit 200. In response to this, the integrated circuit 200 outputs from the output terminal 11 thereof an erase signal 312 having a frequency of 12 MHz that is determined by the current input to the terminal 12 thereof.

When the control circuit 12 has driven the transistors additionally and sequentially up to the last transistor Q1n (in the illustrated embodiment, transistor Q15) synchronously with the phase sync signals, then the integrated circuit 200 finally outputs an erase signal 312 having a frequency of 20 MHz from the output terminal 11 thereof. Time required to perform the whole erase operation is equal to a total of 7 V periods.

The above-mentioned sequential driving of the transistors Q11-Q1n can be realized by the program of the control circuit 12. Alternatively, this may be realized by a combination of a shift register responsive to the phase sync signal PG and a decoder. Although the illustrated embodiment is structured such that the transistors Q11-Q1n are driven sequentially and additionally, instead of this, the transistors Q11-Q1n may be driven selectively and the frequency of the integrated circuit 200 may be determined by a current which is input to one of the resistors R11-R1n.

Further, the IC drive circuit 202 does not have to be provided in the frequency modulator 24, but it may be provided in the frequency modulator 38.

In the above-mentioned structure, after 1 field of video signals are recorded into 1 track in the magnetic disc 60 and the recording state thereof is confirmed by means of the monitor device 84, if the operator wants to erase such recording, then the operator may operate the erase key in the operation part 104. In response to this operation, the control circuit 12 first outputs the control signal 96 to change over the analog switch 52 to the contact a thereof, and further outputs the control signal 95 to open the analog switch 45, thereby preventing the FM line sequential color difference signals from being input into the mixing device 34. The control circuit 12 also controls the motor drive circuit 58 and the stepping motor 65 to position the magnetic head 56 at a position slightly displaced from a position of the track to be erased.

Also, from the control circuit 12, the erase direction signal 90, output permission signal 91 and control signal 93 are output to the frequency modulator 24, and the erase drive signal 92 is output to the IC drive circuit 202. Consequently, the transistors Q11-Q15 of the IC drive circuit 202 are driven sequentially, so that an erase signal having a frequency of 3 MHz is first output during 3 V periods, and then erase signals respectively having frequencies of 6 MHz, 12 MHz, 15 MHz and 20 MHz are output from the terminal 11 of the integrated circuit 200 respectively only during 1 V period.

Further, these erase signals 312 are then supplied via the analog switch 33, frequency characteristic correction circuit 37, mixing device 34, record amplifier 48 and analog switch 52 to the magnetic head 56. Therefore, in this track, these erase signals 312 are applied such that they are superposed on top of the video signals already recorded therein. Time required to carry out the above operations is equal to 7 V periods and the required time including the preparatory operation is about 150 milliseconds.

After completion of the above operations, the control circuit 12 controls the motor drive circuit 58 again to locate the magnetic head 56 at a position displaced slightly in the reverse direction from the position of the track to be erased and, at this position the above-mentioned erase operations are then carried out again similarly. Thus, the time required to complete the erase operations of 1 recorded track comes to about 300 milliseconds.

On completion of these erase operations, the control circuit 12 returns the switch 52 to the connected state thereof as shown. Then, the states of the signals of the track are displayed in the monitor device 84. When a command to erase all tracks is issued from the operation part 104, if the control circuit 12 is structured such that it is able to perform these recording operations with respect to all tracks automatically and sequentially, then it takes about 15 seconds to erase all of 50 tracks.

It should be noted here that, although the frequencies of the erase signals 312 used in the illustrated embodiment are in the range from 3 MHz to 20 MHz, the upper and lower limit values are not limited to this, but, for example, the lower limit value may be higher or lower than the above-mentioned value. When the erase operations are begun at a frequency higher than the cut-off frequency of the high-pass filter 32 that is connected to the output terminal of the frequency modulator 24, the erase signal 312 may be output from the frequency modulator 24 via the high-pass filter 32 and frequency characteristic correction circuit 37 to the mixing device 34.

As described above, according to the above embodiment of the invention, the erase signal having a frequency that varies in steps can be generated using a simple circuit configuration and thus the signals recorded in the tracks on the magnetic disc can be erased as effectively and fast as in the direct-current erasure.

Figure 12:
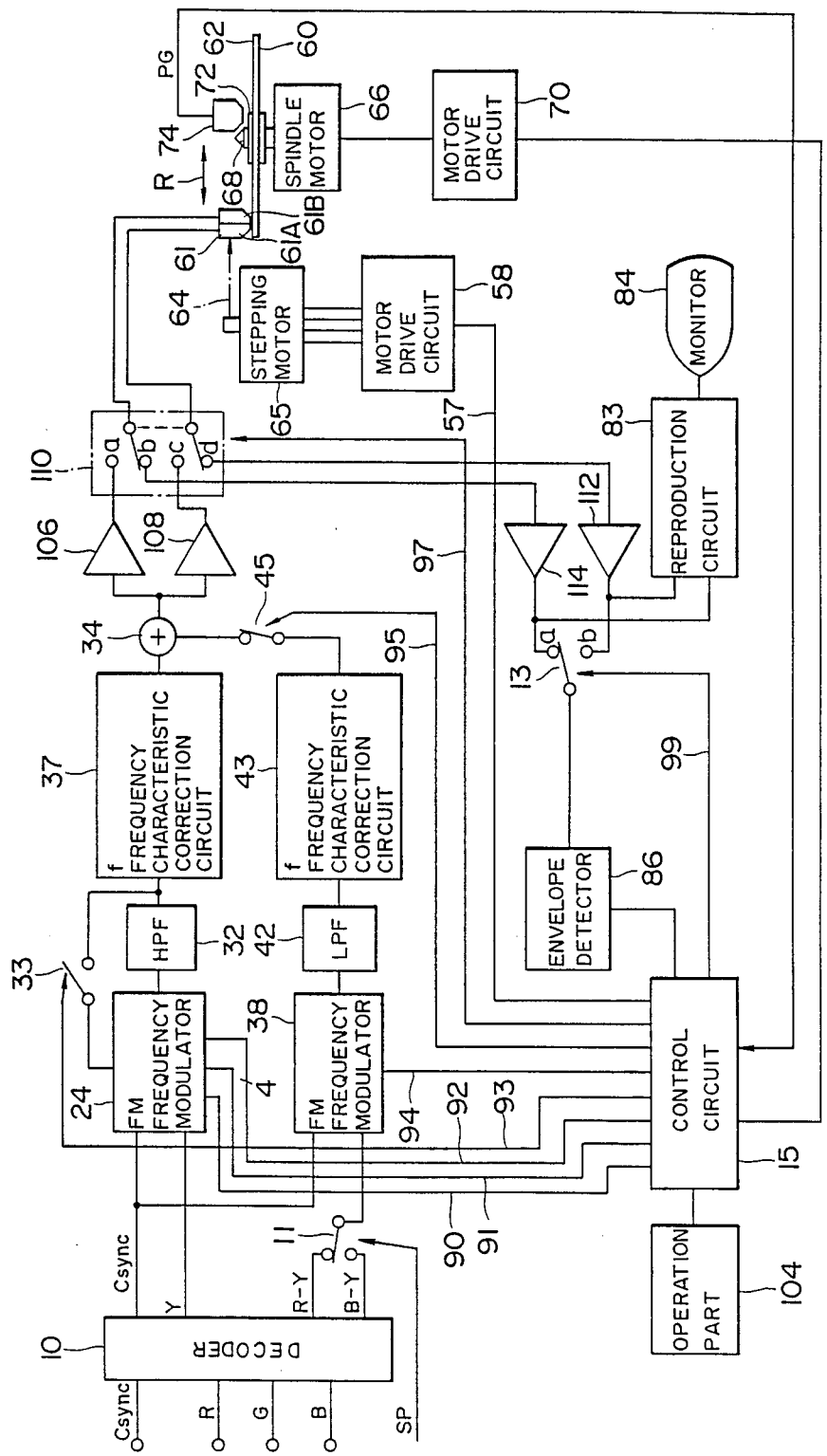
FIG. 12 is a block view showing another embodiment of the magnetic recording/reproducing apparatus to which the present invention is applied; and, FIG. 13 is an explanatory view showing the shifting operation of a magnetic head employed in the magnetic recording/reproducing apparatus shown in FIG. 12.

Referring next to FIG. 12, there is shown another embodiment of a magnetic recording/reproducing apparatus to which the present invention is applied. In FIG. 12, the same parts as shown in FIG. 1 are given the same reference characters and the descriptions thereof are omitted here. In this figure, FM video signals for recording that are output from the mixing device 34 are input to two recording amplifiers 106 and 108 and the signals output from the recording amplifier 106 are supplied via the contact a of an analog switch 110 to the first magnetic head 61A of a composite magnetic head 61. Also, the signals that are output from the recording amplifier 108 are supplied via the contact c of the analog switch 110 to the second magnetic head 61B of the magnetic head 61.

The above-mentioned analog switch 110 can be operated in response to a control signal 97 supplied from the control circuit 12. In reproduction, the analog switch 110 is changed over to the contacts b and d thereof as shown in FIG. 12, and, when recording the signals, it is changed over to the contacts a and c thereof.

The magnetic head 61 is a 2-head type magnetic head which is composed of two integrally constructed magnetic heads each provided with a head gap of the order of 60 μm. The head gap of the first magnetic head 61A of the magnetic head 61 is spaced about 100 μm from the head gap of the second magnetic head 61B thereof. The magnetic head 61 is adapted to record 1 field of video signals in each of two tracks and reproduce 1 field of video signals recorded in each of the two tracks. Also, by using one of the two magnetic heads, the magnetic head 61 is able to record or reproduce signals as in a single-type magnetic head.

It should be noted here that, in this embodiment, the first magnetic head 61A and second magnetic head 61B of the magnetic head 61 are respectively provided with the same reproduction characteristic as shown in FIG. 4.

A reproduction amplifier 112 is adapted to amplify the reproduced FM video signals of the field that are reproduced by the first magnetic head 61A of the magnetic head 61 and a reproduction amplifier 114 is adapted to amplify the reproduced FM video signals that are reproduced by the second magnetic head 61B of the magnetic head 61. The reproduced FM video signals output from the reproduction amplifier 112 are supplied to the contact b of an analog switch 13 and the reproduced FM video signals output from the reproduction amplifier 114 are supplied to the contact a of the analog switch 13.

In response to a control singal 99 that is output from a control circuit 15, the analog switch 13 switches the respective reproduced FM video signals reproduced from two tracks alternately at a cycle of 1 V and outputs them to the envelope detector 86.

A reproduction circuit 83 is adapted to convert 2 fields of the reproduced FM video signals respectively output from the two reproduction amplifiers 112, 114 into video signals in the NTSC system, so that still images based on these reproduced FM video signals can be reproduced in the video monitor device 84.

The control circuit 15 supervises and controls the operations of the whole appapratus, and, in addition to the above-mentioned various controls, it performs the control of recording and reproduction into the fields or frames especially by the magnetic head 61.

Next, description will be given of the operation of the above-structured magnetic recording/reproducing apparatus in connection with FIG. 13. The spindle motor 66 is constantly rotating at a given speed of 3,600 rpm. The analog switch 110 is normally connected as shown in FIG. 12 (at the contacts b and d thereof). Therefore, if video signals have been recorded in the magnetic disc 60, then the video signals can be reproduced in the video monitor device 84 through the reproduction amplifiers 112, 114 and the reproduction circuit 83.

A head shift key in the operation part 104 is operated to position the magnetic head 61 at the position of two empty tracks of the magnetic disc 60. This positioning is performed by the control circuit 12 controlling the motor drive circuit 58 in response to the operation of the head shift key, and whether the two tracks are vacant (not recorded) or not can be confirmed by the control circuit 15 detecting the reproduction output of the magnetic head 61 by means of the envelope detector 86.

When the magnetic head 61 is positioned at the vacant tracks, then the operator operates a video key in the operation part 104. As a result of this, at first, the composite synchronizing signal Csync and brightness signal Y that are output from the decoder 10 are frequency modulated by the frequency modulator 24 and the FM brightness signal output from the frequency modulator 24 is input via the high-pass filter 32 and frequency characteristic correction circuit 37 to the mixing circuit 34. Also, the chroma signals, C, that is, color difference signals R-Y, B-Y that are output from the decoder 10 are converted into line sequential color difference signals by the analog switch 11, and are then frequency modulated by the frequency modulator 38. Then, the FM line sequential color difference signals that are output from the frequency modulator 38 are input through the low-pass filter 42 and frequency characteristic correction circuit 43 into the mixing circuit 34, where they are mixed with the FM brightness signal.

Correspondingly to the above operation, the control circuit 15 outputs the control signal 96 to thereby switch the analog switch 52 only during 1 V period from the phase sync signal PG to the contacts a and c thereof which are opposed to those shown in FIG. 12. The FM video signal for recording that is output from the mixing circuit 34 is supplied through the recording amplifiers 106, 108 and analog switch 110 to the magnetic head 61, and 1 field of video signals are recorded as the frame signals in the two tracks of the magnetic disc 60. The reproduction outputs of the magnetic head 61 can be visualized in the video monitor device 84 by means of the analog switch 110 that is returned to its original position (that is, it is connected at the contacts b and d thereof) and the reproduction amplifiers 112, 114, with the result that the recording state of the tracks can be confirmed. Thus, by performing these operations repetitively, the video signals of one frame can be sequentially recorded in the empty tracks of the magnetic disc 60.

When it is desired to erase all of the video signals that have been recorded into the magnetic disc 60 in the above-mentioned manner, the all track erase key of the operation part 104 may be operated. The control circuit carries out the tracking control in response to the operation of the all track erase key to thereby position, for example, the first magnetic head 61A of the magnetic head 61 on the center of the track No. -1 track and the second magnetic head 61B thereof on the center of the track No. 0 track, respectively. Next, the control circuit 15 at first outputs the control signal 96 to thereby switch the analog switch 110 to the contacts a and c thereof, and then outputs the control signal 95 to thereby open the analog switch 45, so that the FM line sequential color difference signal is prevented from being input to the mixing circuit 34. The control circuit 15 outputs the erase signal 90, output permission signal 91 and control signal 93 to the frequency modulator 24, and, as shown in FIG. 6, the erase drive signal 92 is output to the base terminal 94 of the transistor Q7 of the integrated circuit drive circuit 202 during the period T1 ranging from the time t0 to the time t1. As a result of this, an erase signal having a frequency of 7 MHz or so is output from the terminal 11 of the integrated circuit 200 of the frequency modulator 24 and the erase signal is then supplied through the analog switch 110 to the magnetic head 61. Correspondingly to this, the control circuit 15 supplies to the motor drive circuit 58 the stepping motor drive signal 57 for outputting 1,040 forward feeding drive pulses, for example, at the rate of 600 PPS. Responsive to the stepping motor drive signal 57, the motor drive circuit 58 controls the stepping motor 65 to thereby, as shown in FIG. 13, shift the first magnetic head 61A of the magnetic head 61 positioned on the center of the record track 62A of the track No. -1 track from the position shown by reference character 161A to the position shown in the inward peripheral side of the track No. -1 track by 161B by a distance l2 of about 30 μm while the magnetic disc 60 is rotated once. Also, simultaneously with this, the second magnetic head 61B of the magnetic head 61 positioned on the center of the record track 62A of the No. 0 track is shifted about 30 μm during one rotation of the magnetic disc 60 from the position designated by reference character 162A to the position shown in the inner peripheral side of the No. 0 track by reference character 162B. As a result of this, the magnetic head 61 is shifted about 60 μm during two rotations of the magnetic disc 60 and the erase signals each with a frequency of about 7 MHz are applied spirally in the respective record tracks 62A and guard bands 62B of the two tracks. After then, the stepping motor 65 moves the first magnetic head 61A of the magnetic head 61 to the center position (which is shown by 161C) of the inner-periphery-side record 62A of the track No. 51 track and the second magnetic head 61B to the center position (shown by 162C) of the record 62A of the track No. 52 track. In this manner, by the stepping motor 65, the first magnetic head 61A of the magnetic head 61 is shifted a distance L2 of about 5,200 μm in 1.73 seconds or so from the track No. -1 track to the center position of the record track 62A of the track No. 51 track, and the second magnetic head 61B is shifted a distance L2 of about 5,200 μm in 1.73 seconds or so from the No. 0 track to the center position of the record 62A of the track No. 52 track. During this, the erase signals are applied spirally. That is, the erase drive signals 92 are output only during a period T1 of about 1.73 seconds, that is, while the magnetic head 61 is being moved along the tracks, from the control circuit 15 to the base terminal 94 of the transistor Q7 of the frequency modulator 24.

Next, the control circuit 15 outputs the erase drive signal 92 to the base terminal 96 of the transistor Q8 of the IC drive circuit 202 during a period T2 ranging from the time t1 to the time t2, with the result that an erase signal with a frequency of about 10.5 MHz is output from the terminal 11 of the integrated circuit 200 of the frequency modulator 24 and the erase signal is then supplied via the analog switch 110 to the magnetic head 61. Also, correspondingly to this, a stepping motor drive signal 57 to output 1,040 drive pulses which are used to move the magnetic head 61 in the reverse direction to the original position of the track Nos. -1, 0 track is output, for example, at the rate of 1,200 PPS from the control circuit 15 to the motor drive circuit 58. In response to the stepping motor drive signal 57, the motor drive circuit 58 controls the stepping motor 65 to thereby shift the first magnetic head 61A of the magnetic head 61 positioned centrally of the No. 51 track and the second magnetic head 61B positioned centrally of the No. 52 track, respectively, about 60 μm in the respective outer-periphery-sides of the tracks during one rotation of the magnetic disc 60. As a result of this, the magnetic head 61 is moved about 120 μm by the stepping motor 65 during two rotations of the magnetic disc 60 and the erase signals each having a frequency of about 10.5 MHz are applied spirally in the track Nos. 51, 52 and the outer-periphery-sides thereof. Afterwards, the motor drive circuit 58 controls the stepping motor 65 so that the magnetic head 61 is moved the distance L2 in 0.87 seconds or so from the track Nos. 51, 52 tracks to the initial positions of the track Nos. -1, 0 tracks and during this the erase signals are applied in a spiral manner. In other words, from the control circuit 15 to the base terminal 96 of the transistor Q8 of the frequency modulator 24, the erase drive signals 92 are output only for the period T2 of about 0.87 seconds during which the magnetic head 61 is being moved along the tracks.

Then, the control circuit 15 outputs the erase drive signal 92 to the base terminal 98 of the transistor Q9 of the IC drive circuit 202 during a period T3 ranging from the time t2 to a time t3. Consequently, an erase signal with a frequency of about 14 MHz is output from the terminal 11 of the integrated circuit 200 of the frequency modulator 24 and the erase signal is then supplied via the analog switch 110 to the magnetic head 61. Also, correspondingly to this, the control circuit 15 supplies to the motor drive circuit 58 the step motor drive signal 57 to output 1,040 forward feeding drive pulses, for example, at the rate of 1,200 PPS. In response to the stepping motor drive signal 57, the motor drive circuit 58 controls such that, similarly as mentioned above, during one rotation of the magnetic disc 60, the magnetic head 61 is shifted about 60 μm in about 0.87 seconds from the track Nos. -1, 0 tracks to the track Nos. 51, 52 tracks and during this shifting the erase signals are applied spirally. That is, from the control circuit 15 to the base terminal 98 of the transistor Q9 of the frequency modulator 24, the erase signals 92 are output only for the period T3 of about 0.87 seconds during which the magnetic head 56 is being moved along the tracks.

Further, during a period T4 ranging from the time t3 to a time t4, the control circuit 15 outputs the erase drive signal 92 to the base terminal 100 of the transistor Q10 of the IC drive circuit 202, with the result that an erase signal having a frequency of about 20 MHz is output from the terminal 11 of the integrated circuit 200 of the frequency modulator 24 and the erase signal is then supplied via the analog switch 110 to the magnetic head 61. Also, correspondingly to this, the control circuit 15 supplies to the motor drive circuit 58 the stepping motor drive signal 57 to output 1,040 reverse feeding drive pulses, for example, at the rate of 1,200 PPS. In response to the stepping motor drive signal 57, the motor drive circuit 58 controls the stepping motor 65 such that the magnetic head 61 is moved the distance L2 in about 0.87 seconds from the track Nos. 51, 52 tracks back to the inital positions of the track Nos. -1, 0 tracks and during this the erase signals are applied in a spiral manner. That is, from the control circuit 15 to the base terminal 100 of the transistor Q10 of the frequency modulator 24, the erase drive signals 92 are output only for the period T4 of about 0.87 seconds during which the magnetic head 61 is being shifted along the tracks.

As mentioned above, in the embodiment of the magnetic record erase circuit according to the invention, when erasing the FM video signals recorded on the 50 tracks of the magnetic disc, at first, during the period T1, the FM chroma signals recorded in all tracks are erased only for about 1.73 seconds using the erase signals each having a frequency (the first frequency) higher than that of the lowest-frequency FM chroma signal and also having a current value greater than the optimum recording current value of the magnetic head. Then, in the periods T2 to T4, the erase signal having a frequency which is increased in three steps is used to erase the FM brightness signals in all tracks only for 0.87 seconds in each of the periods, so that all of the 50 tracks can be erased only in about 4.3 seconds.

Thus, according to the embodiment, by setting the first frequency of the erase signal in the neighborhood of the upper limit value of the frequencies that can be recorded by the magnetic head and higher than that of the lowest-frequency signal among a plurality of signals to be erased, the erase time can be reduced.

Also, although, in this embodiment, the current value of the erase signal is set higher than the optimum recording current value of the magnetic head in the range from the first frequency (about 7 MHz) to the second frequency (about 20 MHz), the present invention is not limited to this, but other settings may be possible provided that the current value of at least the erase signal in the first frequency is set higher.

Further, due to the fact that the position to initiate and terminate the application of the erase signal is set on the track in which the video signals representing the still images are not recorded, there is eliminated the possibility that the video signals may be affected by damage or the like of the magnetic disc that may be produced, for example, when the magnetic disc is struck by the magnetic head.

In addition, in the above embodiment, a circuit which generates the erase signal is provided within the frequency modulator 24 for recording. Such provision is advantageous in that a frequency oscillation circuit capable of frequency modulation of a brightness signal can be used. However, the invention is not limited to this, but such frequency oscillation circuit may be provided in the frequency modulator 38 for a color difference signal, for example. Also, there may be provided another oscillation circuit other than the abovementioned frequency modulators. It should be noted that the use of one or more frequency modulators is advantageous in that a circuit configuration is not complicated.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A magnetic record erase circuit comprising:
   recording means for rotatively driving a rotary magnetic recording medium and for magnetically recording a frequency signal such as a video signal or the like in each of a plurality of recording units of said rotary magnetic recording medium;
   erase signal generation means for generating an erase signal and supplying said erase signal to said recording means; and,
   control means for controlling said erase signal generation means to vary the frequency of said erase signal in at least two discrete frequency steps synchronously, said steps including three separate and mutually increasing frequencies with the rotation of said rotary magnetic recording medium,
   said erase signal with said stepwise varied frequency being applied to said recording units of said rotary magnetic recording medium to erase video signals recorded therein.

2. A magnetic record erase circuit as set forth in claim 1, wherein said erase signal generation means includes a multivibrator which generates said erase signal and said control means varies the control current of said multivibrator in steps to effect a variation in frequency of said erase signal.

3. A magnetic record erase circuit as set forth in claim 2, wherein said rotary magnetic recording medium is a magnetic disc, said recording unit of said recording medium is a track in which 1 field or 1 frame of video signals are to be recorded, and said erase signal varies in steps in the range from about 3 MHz to 20 MHz.

4. A magnetic record erase circuit comprising:
   recording means including a magnetic head for rotatively driving a rotary magnetic recording medium and recording a plurality of frequency multiplexed frequency signals such as video signals in each of a plurality of tracks of said rotary magnetic recording medium;
   erase signal generation means for generating an erase signal and supplying said erase signal to said recording means;
   current setting means for setting the current value of said erase signal; and
   control means for controlling said erase signal generation means and said current setting means when signals recorded in a track are to be erased to vary the frequency of said erase signal in a plurality of discrete frequency steps in the range from a first frequency lower than the upper limit of the recording frequency band of said magnetic head and higher than the center frequency of the lowest-frequency signal among said plurality of frequency signals to a second frequency higher than said upper limit of said recording frequency band and also to set at least the current value of said erase signal in said first frequency to be higher than the optimum recording current value of said magnetic head.

5. A magnetic record erase circuit as set forth in claim 4, wherein said plurality of signals comprises two signals, one of said two signals having a lower frequency being a chroma signal of, and the other having a higher frequency being a brightness signal.

6. A magnetic record erase circuit as set forth in claim 5, wherein said first frequency of said erase signal is in the neighborhood of the upper limit value of the frequencies that can be recorded by said magnetic head.

7. A magnetic record erase circuit as set forth in claim 5, wherein said first frequency of said erase signal is selected substantially in the range of the modulated frequency of said brightness signal.

8. A magnetic record erase circuit as set forth in claim 4, wherein said current value of said erase signal in said first frequency is at least 1.2 times said optimum recording current value.

9. A magnetic record erase circuit as set forth in claim 5, wherein the voltage of said chroma signal is lower by about 20 dB than that of said brightness signal when said chroma signal is being recorded.

10. A magnetic record erase circuit as set forth in claim 5, wherein said chroma signal has a bandwidth in the range of about 0 to 2.5 MHz and said brightness signal has a bandwidth in the range of about 2.5 to 12 MHz and wherein said first frequency is selected in the range of about 6 to 7.5 MHz and said second frequency is selected in the range of 20 MHz or higher.

11. A magnetic record erase circuit comprising:
recording means including a magnetic head for rotatively driving a rotary magnetic recording medium and recording a plurality of frequency-multiplexed frequency signals such as video signals or the like in each of a plurality of tracks provided on said rotary magnetic recording medium;
magnetic head shift means for shifting said magnetic head in the radial direction of said rotary magnetic recording medium;
erase signal generation means for generating an erase signal and supplying said erase signal to said recording means;
current setting means for setting the current value of said erase signal; and,
control means for controlling said recording means, magnetic head shift means, erase signal generation means and current setting means when recorded signals are to be erased to vary the frequency of said erase signal in a plurality of discrete frequency steps in the range from a first frequency lower than the upper limit of the recording frequency band of said magnetic head and higher than the center frequency of the lowest-frequency signal among said plurality of frequency signals to a second frequency higher than said upper limit of said recording frequency band and to set said current value of said erase signal higher than the optimum recording current value of said magnetic head, and also, in each of said steps in which said frequency of said erase signal is varied stepwise, to supply said erase signal having a given frequency to said magnetic head, said magnetic head being shifted in the direction of said rotary magnetic recording medium so that said erase signal can be applied to all of said tracks in each of said steps to erase video signals recorded therein.

12. A magnetic record erase circuit as set forth in claim 11, wherein said plurality of signals comprises two signals, one of said two signals having a lower frequency being a chroma signal, and the other having a higher frequency being a brightness signal.

13. A magnetic record erase circuit as set forth in claim 12, wherein said erase signal of said first frequency is in the neighborhood of the upper limit value of the frequencies that can be recorded by said magnetic head.

14. A magnetic record erase circuit as set forth in claim 12, wherein said first frequency of said erase signal is selected substantially in the range of the modulated frequency of said brightness signal.

15. A magnetic record erase circuit as set forth in claim 11, wherein said current value of said erase signal of said first frequency is at least 1.2 times the optimum recording current value of said magnetic head.

16. A magnetic record erase circuit as set forth in claim 12, wherein the voltage of said chroma signal is lower by about 20 dB than that of said brightness signal when said chroma signal is being recorded.

17. A magnetic record erase circuit as set forth in claim 12, wherein said chroma signal has a bandwidth in the range of about 0 to 2.5 MHz and said brightness signal has a bandwidth in the range of about 2.5 to 12 MHz, and wherein said first frequency is selected in the range of about 6 to 7.5 MHz and said second frequency of said erase signal is selected in the range of 20 MHz or higher.

* * * * *